Sept. 29, 1925.
S. STENBOCK
1,555,329
DEVICE FOR ACTUATING AND SECURING RECIPROCATABLE MEMBERS
Filed Feb. 12, 1924
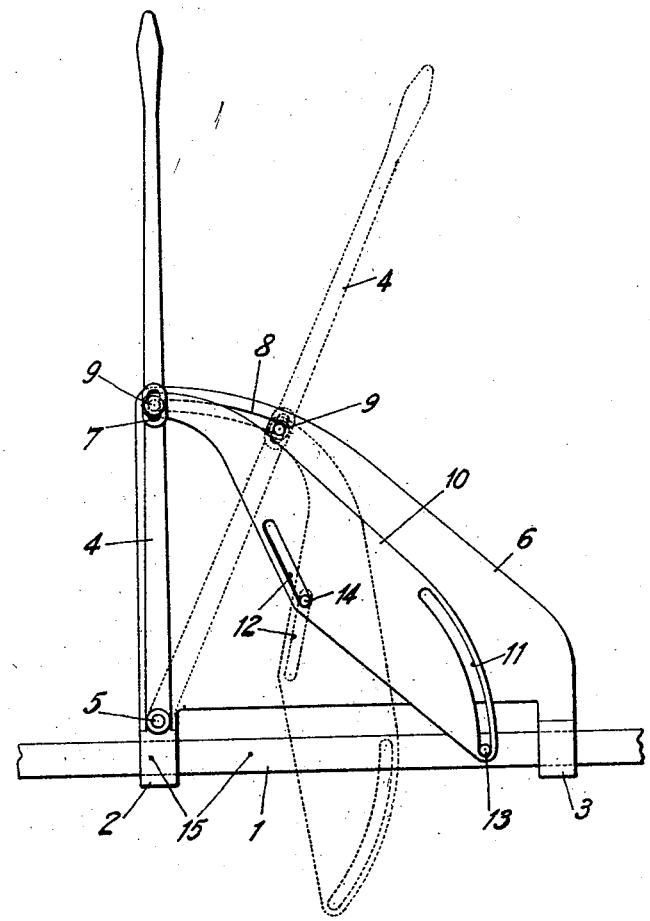
Inventor:
Serge Stenbock Patented Sept. 29, 1925.

1,555,329

UNITED STATES PATENT OFFICE.

SERGE STENBOCK, OF LAUSANNE, SWITZERLAND.

DEVICE FOR ACTUATING AND SECURING RECIPROCABLE MEMBERS.

Application filed February 12, 1924. Serial No. 692,234.

*To all whom it may concern:*

Be it known that I, SERGE STENBOCK, a citizen of Russia, and residing at Lausanne, Switzerland, have invented certain new and useful Improvements in Devices for Actuating and Securing Reciprocable Members, of which the following is a specification.

My invention relates to devices for actuating and securing in position reciprocatory members.

When members were to be reciprocated heretofore, for example when an automobile band-brake was to be applied by a hand lever it was necessary to use separate devices, e. g. a toothed rack and spring bolt, for securing the lever in the position to which it was moved. Such racks and spring bolts however do not admit of fixing the movable member at any desired point but only at places determined by the notches of the rack. The fixing was effected heretofore not by automatic clamping but generally resiliently e. g. by means of springs.

An important object of this invention is to provide a device of the kind referred to which operates in an improved manner.

In the device according to the present invention the part to be reciprocated is engaged by a member by means of a guide lying transversely of the path of said part, which member is guided in such a manner that when it is shifted it rotates and actuates the reciprocatory part, but cannot be rotated by the latter which is fixed by the stationary member against unintentional movement.

One embodiment of the invention is diagrammatically illustrated by way of example in the accompanying drawing.

According to the drawing, a rod 1 is guided to be reciprocated endwise in two bearings 2 and 3 by a lever 4. This lever is fulcrumed at 5 on a plate 6 on which said bearings are provided, and is provided with a loop 7. A pin 9 of a tumbler 10 connecting the lever 4 with the rod 1 extends through this loop 7 and through an arcuate slot 8 in the plate 6. The tumbler 10 has at its end remote from the pin 9 an arcuate slot 11, and intermediate the pin 9 and slot 11 it has a slot 12 running slantwise of the direction of its length. A pin 13 on the rod 1 extends into the slot 11, and a pin 14 on the plate 6 extends into the slot 12. This pin 14 constitutes a fixed guide and also the fulcrum of the tumbler 10.

In the position of the parts shown in full lines, the tumbler 10 is in its upper position and the rod 1 in its extreme right hand position. When the lever 4 is moved out of the position shown in full lines into that indicated by broken lines, the tumbler 10 is shifted at its upper end by the pin 9 along the slot 8 and at its lower end transversely of the rod 1. In so doing the tumbler slides at the slot 12 against the pin 14 and at the same time turns about the same. The pin 13 in the slot 11 is thereby shifted with the rod 1 from the right hand to the left in the drawing, as in every position of the tumbler the pin 14 lies within the area of the circle whereof the slot 11 constitutes part of its circumference, but is eccentric to its center 15, it being nearer thereto at the upper end of the slot than at the lower.

Further, the center of the arc of the slot 11 is arranged in the longitudinal axis of the rod 1, and the radius of the said arc is so selected that the portion of the slot 11 containing the pin 13 lies at right angles to the longitudinal direction or path of the rod 1 in every position of the tumbler. Consequently, the rod 1 can be shifted by means of the lever 4 and tumbler 10 with a minimum of effort, and an automatic locking of the rod 1 is simultaneously effected. Forces acting on the latter in its longitudinal direction exercise a turning moment on the tumbler, but this cannot turn about the pin 14 because the pin 9 cannot move transversely of the slot 8. The lever 4 thus enables the rod 1 to be set in any desired position in which it is secured by the tumbler 10 against undesired movement in the direction of its length.

If desired, the slot 8 may be omitted and the tumbler 10 pivotally attached to the lever 4, so that the pivot-pin would guide the tumbler. Alternatively, the latter could be actuated, instead of directly by the lever, by means of a link or other rod or lever.

The described device is particularly adapted for actuating brakes, for throwing friction clutches into and out of gear, and for all cases in which a reciprocable part is to be fixed at any desired part of its path.

I claim:—

1. The combination with a stationary member, of a reciprocatory member, a pivoted actuating member having a curved guide engaging said reciprocatory member, an operating member for operating said actuating member to thereby shift said reciprocatory member, and a means on said stationary member for guiding said actuating member.

2. The combination with a stationary member, of a reciprocating member, a pivoted actuating member having a curved guide engaging said reciprocatory member, a pivoted operating member for operating said actuating member to thereby shift the said reciprocating member, the said actuating member having a movable pivotal connection with the said operating member, and a means on said stationary member intermediate the said movable pivotal connection and the point of engagement of said actuating member with said reciprocating member for guiding said actuating member at the same time constituting a fulcrum therefor.

3. The combination with a stationary member, of a reciprocating member, an actuating member engaging said reciprocating member by means of a curved guide extending transversely of the path of travel of said reciprocating member, a fixed pivot on said stationary member engaging a straight slot in said actuating member for guiding the same at the same time constituting a fulcrum therefor, said operating member having a movable point of connection with said actuating member, said fulcrum and slot being located between said movable point and the point of engagement between said actuating member and said reciprocatory member.

4. The combination with a stationary member having bearings, of a reciprocating member longitudinally movable in said bearings, an actuating member having a curved guide engaging a pin on said reciprocatory member, an operating member pivoted to said stationary member and having a loop for receiving a pivot on said actuating member, a fulcrum pin on said stationary member engaging a straight slot in said actuating member, said fulcrum pin and slot being located intermediate the pivotal connection of said actuating member with said operating member and its point of engagement with said reciprocatory member, and an arcuate guide in said stationary member for the pivot of said actuating member, the center of curvature of said arcuate guide being coincident with the fulcrum of said operating member.

In testimony whereof, I affix my signature.

Doct. SERGE STENBOCK.